(12) United States Patent
Luo et al.

(10) Patent No.: US 7,472,401 B2
(45) Date of Patent: *Dec. 30, 2008

(54) COMPUTER PRODUCT FOR A DYNAMICALLY GENERATED WRAPPER CLASS

(75) Inventors: Fei Luo, Bedminster, NJ (US); Alexander Somogyi, Bernardsville, NJ (US); William John Gallagher, Easton, PA (US); Rahul Srivastava, Randolph, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/706,515

(22) Filed: Nov. 12, 2003

(65) Prior Publication Data

US 2004/0172640 A1    Sep. 2, 2004

Related U.S. Application Data

(60) Provisional application No. 60/450,901, filed on Feb. 28, 2003.

(51) Int. Cl.
*G06F 9/46* (2006.01)
*G06F 9/44* (2006.01)
(52) U.S. Cl. ............ 719/330; 719/315; 719/316; 719/328; 717/108
(58) Field of Classification Search ............ 719/316, 719/328, 330, 315; 717/106–108
See application file for complete search history.

(56) References Cited

U.S. PATENT DOCUMENTS

| | | | |
|---|---|---|---|
| 4,989,132 A | 1/1991 | Mellender | |
| 5,815,415 A | 9/1998 | Bentley | |
| 5,999,988 A | 12/1999 | Pelegri-Llopart | |
| 6,011,917 A | 1/2000 | Leymann | |
| 6,011,918 A | 1/2000 | Cohen | |
| 6,085,030 A | 7/2000 | Whitehead | |
| 6,085,198 A | 7/2000 | Skinner | |
| 6,125,383 A | 9/2000 | Glynias | |
| 6,157,960 A * | 12/2000 | Kaminsky et al. | 719/315 |
| 6,321,261 B1 | 11/2001 | Glass | |
| 6,381,737 B1 | 4/2002 | Click | |

(Continued)

OTHER PUBLICATIONS

Ian Welch and Robert Stroud, "From Dalang to Kava—the Evolution of a Reflective Java Extension," Sep. 1999, Reflection '99, LNCS 1616, pp. 2-21.*

(Continued)

*Primary Examiner*—Li B Zhen
(74) *Attorney, Agent, or Firm*—Fliesler Meyer LLP (57) ABSTRACT

A dynamic generated wrapper object to intercept transmissions between a vendor object and an application program and performs server side tasks. To dynamically generate the wrapper at runtime in memory, the application server receives a vendor class, performs reflection on the vendor class, generates a wrapper class, and creates an instance of the wrapper class. In operation, the dynamically generated wrapper object receives a call placed to a method of the wrapped object, initiates pre-processing tasks to be performed, calls the method on the wrapped object, receives a result from the method invocation against the wrapped object, initiates post-processing tasks to be performed, and transmits the wrapped result back to the application program. The pre-processing tasks may include execution of a pre-invocation handler. The post-processing tasks may include execution of a post-invocation handler.

24 Claims, 4 Drawing Sheets

U.S. PATENT DOCUMENTS

| | | | |
|---|---|---|---|
| 6,385,661 B1 * | 5/2002 | Guthrie et al. | 719/316 |
| 6,389,452 B1 | 5/2002 | Glass | |
| 6,415,315 B1 | 7/2002 | Glass | |
| 6,442,586 B1 | 8/2002 | Glass | |
| 6,463,460 B1 * | 10/2002 | Simonoff | 709/203 |
| 6,510,550 B1 * | 1/2003 | Hightower et al. | 717/108 |
| 6,513,157 B1 | 1/2003 | Glass | |
| 6,519,653 B1 | 2/2003 | Glass | |
| 6,523,171 B1 | 2/2003 | Dupuy | |
| 6,535,928 B1 | 3/2003 | Glass | |
| 6,549,955 B2 * | 4/2003 | Guthrie et al. | 719/315 |
| 6,578,191 B1 * | 6/2003 | Boehme et al. | 717/107 |
| 6,622,175 B1 | 9/2003 | Piller | |
| 6,629,128 B1 * | 9/2003 | Glass | 709/203 |
| 6,678,743 B1 | 1/2004 | Glass | |
| 6,834,389 B1 | 12/2004 | Glass | |
| 6,877,163 B1 * | 4/2005 | Jones et al. | 719/332 |
| 6,931,455 B1 | 8/2005 | Glass | |
| 6,947,965 B2 | 9/2005 | Glass | |
| 6,951,021 B1 | 9/2005 | Bodwell | |
| 6,961,772 B1 | 11/2005 | Wensel | |
| 6,993,774 B1 * | 1/2006 | Glass | 719/330 |
| 7,051,324 B2 * | 5/2006 | Gissel et al. | 717/166 |
| 7,146,399 B2 * | 12/2006 | Fox et al. | 709/203 |
| 7,181,745 B1 | 2/2007 | Foti | |
| 2002/0152210 A1 * | 10/2002 | Johnson et al. | 707/9 |
| 2003/0105883 A1 * | 6/2003 | Gibbons | 709/313 |
| 2004/0015832 A1 | 1/2004 | Stapp | |
| 2004/0028031 A1 * | 2/2004 | Valin et al. | 370/352 |
| 2004/0143835 A1 * | 7/2004 | Dattke et al. | 719/315 |

OTHER PUBLICATIONS

Ian Welch and Robert Stroud, "Using MetaObject Protocols to Adapt Third-Party Components," Mar. 1998, 1-22.*

Ian Welch and Robert Stroud, "A Reflective Java Class Loader," ECOOP'98 Workshop Reader, LNCS, pp. 374-375, 1998.*

* cited by examiner

COMPUTER PRODUCT FOR A DYNAMICALLY GENERATED WRAPPER CLASS

CLAIM TO PRIORITY

The present application claims the benefit of priority under 35 U.S.C. §119(e) to U.S. Provisional Patent Application entitled "DYNAMICALLY GENERATED WRAPPER", Application No. 60/450,901, filed on Feb. 28, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 10/706,516, entitled "DYNAMIC CODE GENERATION SYSTEM", filed on Nov. 12, 2003, and U.S. Patent Application No. 60/450,614, entitled "METHOD FOR DYNAMICALLY GENERATING A WRAPPER", filed on Feb. 28, 2003.

FIELD OF THE INVENTION

The current invention relates generally to wrapping software objects, and more particularly to dynamically wrapping software objects.

BACKGROUND OF THE INVENTION

Application servers provide an environment for programmers to implement application programs for users. BEA System of San Jose, Calif. provides one such application server called Web Logic Server (WLS). Third party vendors typically provide resource adapters, JDBC, JMS and JCA drivers, for use on these application servers. A programmer may use those resource adapters to provide the services to the user through the programmer's application program. Vendor resource adapters are varied and generally provide a broad range of features to be accessed by application programs.

Within an application server, it is desirable to provide support for global transactions. Generally, this involves tracking the status and availability of resources, changes to shared resources throughout the servers, and managing other features that affect the server system. Accordingly, an application server should be informed regarding transactions that occur between application programs and resources. To effectuate this, an application server may not provide application programs with direct access to vendor objects. Providing application programs with direct access to vendor objects would prevent the application server from knowing what was transpiring between application programs and resources. Application servers implement a middle-ware between the application programs and the resources to determine what transpires in transactions between them.

Previously, middle-ware was implemented by application servers in the form of statically generated proxies. The statically generated proxy included hard coded methods that handled interfaces for specific vendor resource adapters. The application server was designed with a proxy that assumed the presence of certain vendor features, such as a particular type of resource or a particular type of resource interface. These application servers worked well to provide the application programs access to those specific resources. However, an application program encountered difficulties if it was configured to use a resource adapter from a different vendor or any other resource adapter not statically included at the development time of the application server.

What is needed is a system and method for providing application programs access to extension features of third-party resource adapters in addition to allowing the application server to monitor the activities between the application programs and resource adapters. It would be desirable to provide the full access to the vendor object to the application programs as well as intercept calls made to an returned from the vendor object to handle server side tasks, global transaction enlistment, connection pooling, statement caching, tracing and profiling.

SUMMARY OF THE INVENTION

A wrapper object for a vendor object is generated dynamically at runtime. In one embodiment of the present invention, the Dynamic Generated Wrapper (DGW) is a proxy generated at runtime and acts as a delegate for the underlying vendor object being proxied. In one embodiment, the wrapper class may be a subclass of a statically predefined superclass that includes the programming logic to handle server side tasks. The wrapper class may include methods in the vendor class that are not present in the superclass. A wrapper object is an instance of a wrapper class. The wrapper object may be used to intercept method invocations from an application program to an vendor object and provide the execution of server side tasks in a pre-invocation handler and post-invocation handler. Additionally, the wrapper object may be used to intercept the result of the method invocation against vendor object. The wrapper object may provide for server side tasks to be performed before providing the wrapped result to the application programs. The server side tasks may include global transaction enlistment, resource pooling, resource caching, tracing and profiling.

DETAILED DESCRIPTION

A wrapper object for a vendor object is generated dynamically at runtime. In one embodiment of the present invention, the Dynamic Generated Wrapper (DGW) is a proxy generated at runtime and acts as a delegate for the underlying vendor object being proxied. In one embodiment, the wrapper class may be a subclass of a statically predefined superclass that includes the programming logic to handle server side tasks. The wrapper class may include methods in the vendor class that are not present in the superclass. The wrapper object may be used to intercept method invocations from an application program to the vendor object and provide the execution of server side tasks in a pre-invocation handler and post-invocation handler. Additionally, the wrapper object may be used to intercept the result of the method invocation against the vendor object. The wrapper object may provide for server side tasks to be performed before providing the wrapped result to the application program. The server side tasks may include global transaction enlistment, resource pooling, resource caching, tracing and profiling.

In one embodiment, it is desirable for application servers that host enterprise applications to allow application programs access to Java Database Connectivity (JDBC) vendor extensions. Accordingly, the wrapper object of the present invention may be implemented as a JDBC wrapper object that acts as a proxy between application programs and JDBC vendor objects. To implement application program access to vendor extension methods, JDBC wrapper class should implement vendor extension interfaces. If the JDBC wrapper class of the present invention does not implement an vendor extension interface, application programs may not utilize the vendor extension features.

Figure 1:
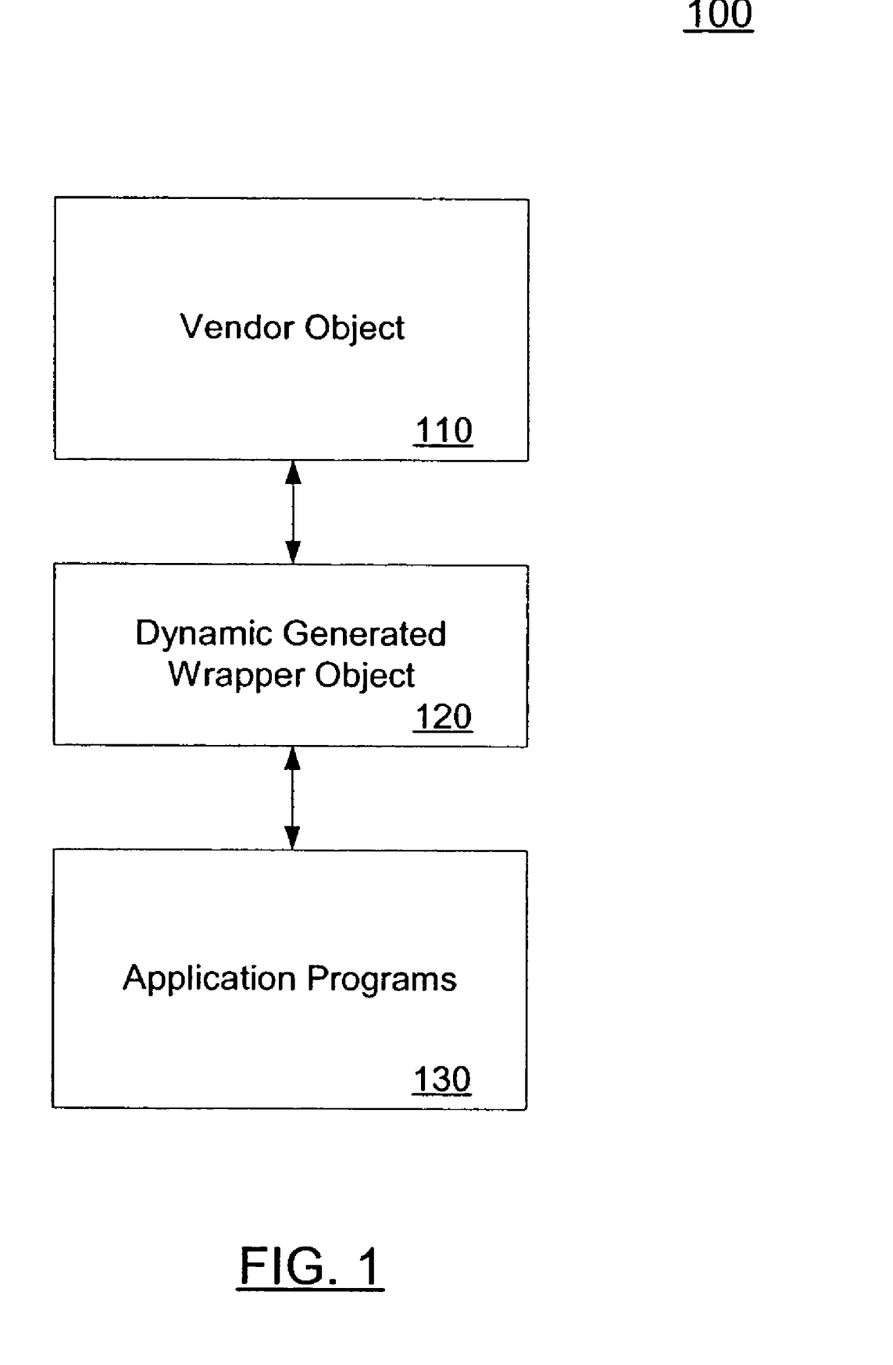
FIG. 1 is an illustration of a system for wrapping a vendor object in accordance with one embodiment of the present invention.

In an application server, an application program may invoke a method against a vendor object. In one embodiment of the present invention, a dynamically generated wrapper is used to intercept transmission between vendor object and application program, initiate processing related to the transmissions, and provide the wrapped result back to the application program. FIG. 1 illustrates a system 100 for providing a dynamic generated wrapper for a vendor object in an application server in accordance with one embodiment of the present invention. FIG. 1 includes vendor object 110, dynamic generated wrapper object 120 and application program 130. The dynamic generated wrapper object 120 intercepts communications between the vendor object 110 and the application program 130 as shown. The dynamic generated wrapper object may perform processing at different stages of the invocation of method.

Figure 2:
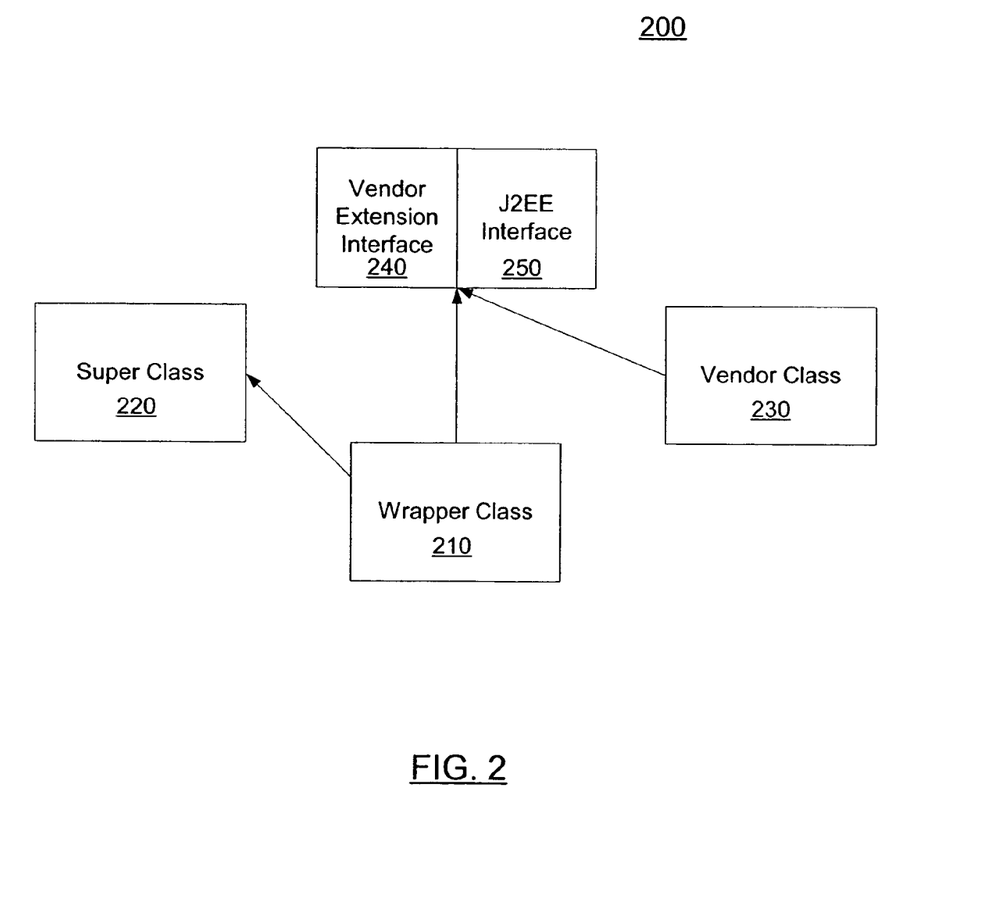
FIG. 2 is an illustration of an expanded superclass in accordance with one embodiment of the present invention.

FIG. 2 illustrates a system 200 having a dynamically generated wrapper class 210 that extends from a statically predefined superclass 220. Dynamically generated wrapper 210 also implements all of the interfaces, including vendor extension interfaces 240 and J2EE interfaces 250, supported by vendor class 230. As discussed above, a vendor class may have a large number of extension methods. These extension methods can be divided into two groups. The first group of those methods are implemented in a superclass. They are known to the application server. The wrapper class is a subclass of the superclass. Thus, every method in the superclass is also contained in the wrapper class.

A typical vendor class may contain a large number of methods. Within these methods, few of them may require special treatment. The special treatment may differ from the typical processing that can be applied to the rest of methods with respect to server side tasks. The remainder of the methods may be handled with a wrapper class in a standard manner such as that illustrated in FIG. 3. For the methods requiring special treatment, a wrapper method should not be automatically generated. These special treatment methods are contained in the statically predefined superclass.

In one embodiment, the superclass 220 has several requirements. In one embodiment, the superclass must be public and not final. Thus, the superclass may be extended by the dynamically generated wrapper class. The superclass must implement a predefined wrapper interface that includes the preInvocation and postInvocation handler. The superclass requires a member variable, to hold the proxied vendor object, and a non-arg constructor, to instantiate the wrapper object. The superclass should also have an init method for initializing the generated wrapper object.

Below is an example of what code implementing a super class may look like.

```
package weblogic.jdbc.pool;
import weblogic.utlis.wrapper.*;
/* WrapperImpl implements Wrapper interface */
public class Connection extends WrapperImpl {
// override the super class method
public Object postInvocationHandler(String methodName, Object[ ] params,
Object ret) {
    super.postInvocationHandler(methodName, params, ret);
    System.out.println("Doing Pooling Stuff");
    return ret;
}
......
}
```

An example of the interface that a superclass implements is shown below.

```
public interface Wrapper {
/**
    set vendor object proxied by this wrapper
* @param obj            vendor object
*/
public void setVendorObj(Object obj);
/**
    get vendor object proxied by this wrapper
* @return            vendor object
*/
public Object getVendorObj( );
/**
    this wrapper method gets invoked before vendor object gets invoked
    @param methodName —name of method that will be invoked on the
    vendor object
    @param params —array of parameters that will be passed to the
    vendor object
*/
public void preInvocationHandler(String methodName, Object[ ] params)
    throws Exception;
/**
    this wrapper method gets invoked after the vendor object gets
    invoked
* @param methodName    name of method that was invoked on vendor
object
    @param params—array of parameters that was passed to vendor object
* @param ret    —return value that was returned by vendor object
* @return    —return value that will be return to the end user
*/
public Object postInvocationHandler(String methodName, Object[ ]
params,
Object ret)
    throws Exception;
}
```

Figure 3:
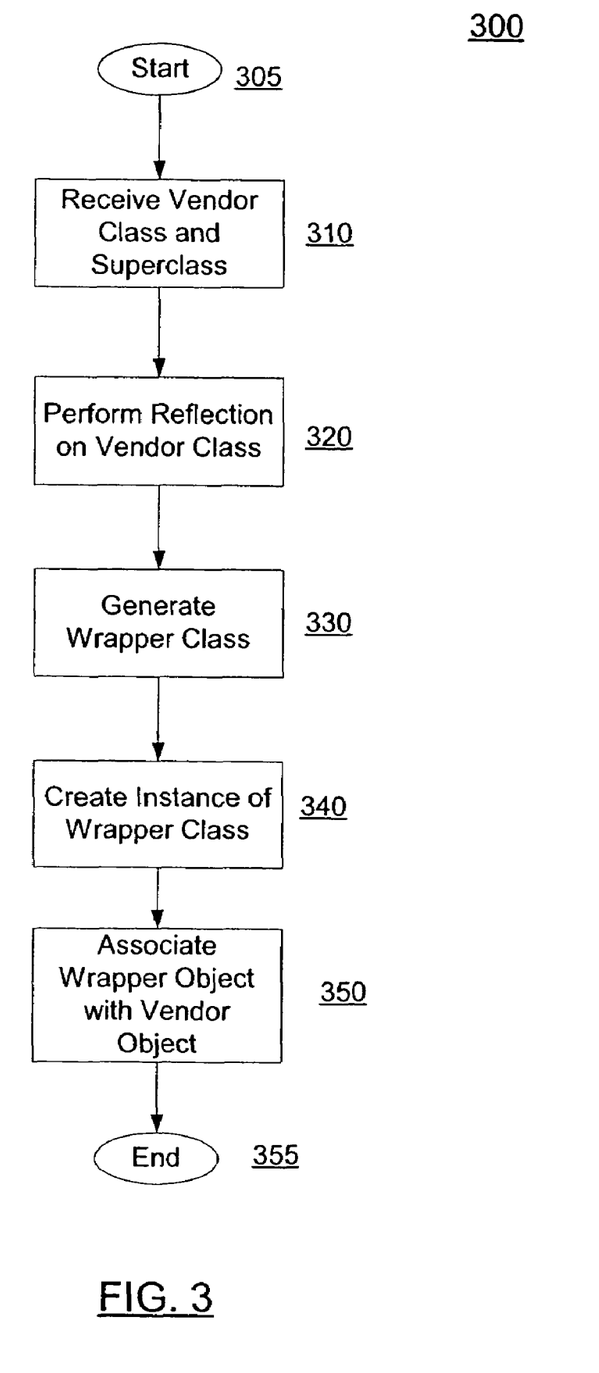
FIG. 3 is an illustration of a method for dynamically generating a wrapper object in accordance with one embodiment of the present invention.

FIG. 3 illustrates a method 300 for dynamically generating a wrapper object in accordance with one embodiment of the present invention. The wrapper object may be dynamically generated at runtime. The method may be performed by a "wrapper factory" software residing in the application server.

Method 300 begins with start step 305. Next, the vendor object and superclass are received in step 310. In one embodiment, the superclass may be one of either pre-existing WLS JDBC, WLS JMS or WLS Connector classes. The pre-existing superclass is used to generate its subclass, wrapper class. In one embodiment, the superclass may contain logic to handle server side tasks including global transaction management, pooling, caching, tracing and profiling.

Next, the system performs reflection on the vendor class at step 320. Reflection is an operational feature of Java that allows meta information, what interfaces vendor class implemented, to be retrieved from code. The retrieved meta information allows the application server to dynamically generate a wrapper class, or proxy class, that perfectly matches with the vendor class. The wrapper class is then generated in memory at step 330. The wrapper class is generated in byte code and extends from the superclass received at step 310. Code is generated for vendor methods not implemented in the superclass. In one embodiment of the present invention, the generated code may be similar to the following code.

```
public int getTransactionIsoloation( ) throws SQLException{
preInvocationHandler("getTransactionIsoloation",null);
return postInvocationHandler(
"getTransactionIsoloation";
null,
vendorObj.getTransactionIsolation( )
);
}
```

In one embodiment, the code is generated using hot code generation techniques as described in related U.S. patent application Ser. No. 10/712,384, entitled "Dynamic Code Generation Method", herein incorporated by reference in its entirety. After generating the wrapper class, an instance of the wrapper class, wrapper object, is created at step 340. The vendor object is then associated with the wrapper object at step 350. The returned wrapper object is then provided to the application program such that the application program may access both the standard features and non-standard vendor extensions. In one embodiment, the standard features are J2EE features. Operation of method 300 then ends at step 355. The wrapper class includes all public interfaces implemented by the vendor class required by the application program. As a result, the application program may cast the wrapper object to the vendor interface to access vendor extension methods.

The application server system may have code for generating the wrapper. An example of code for generating the wrapper is below.

```
package weblogic.jdbc.Driver;
import weblogic.utlis.wrapper.*;
public class Driver implements java.sql.Driver {
......
public java.sql.Connection connect(String url, Properties dbprops)
    throws SQLException
{
    ......
    ConnectionEnv cc = ConnectionPool.reserveWaitSecs(subject,
    poolID, appName, waitSecs);
    /* current code with hardcoded wrapper */
    // Connection poolConnection = new Connection(cc);
    /* current code with hardcoded wrapper */
    /* new code with WDGW */
    Connection poolConnection = /* wrapper object */
    (Connection)WrapperFactory.getWrapper(
        "weblogic.jdbc.pool.Connection", /*super class */
```

```
        cc.conn.jconn, /* vendor object */
        false
    );
    poolConnection.init(cc); /* initialize the wrapper object */
    /* new code with WDGW */
    return (java.sql.Connection)poolConnection;
}
......
}
```

Figure 4:
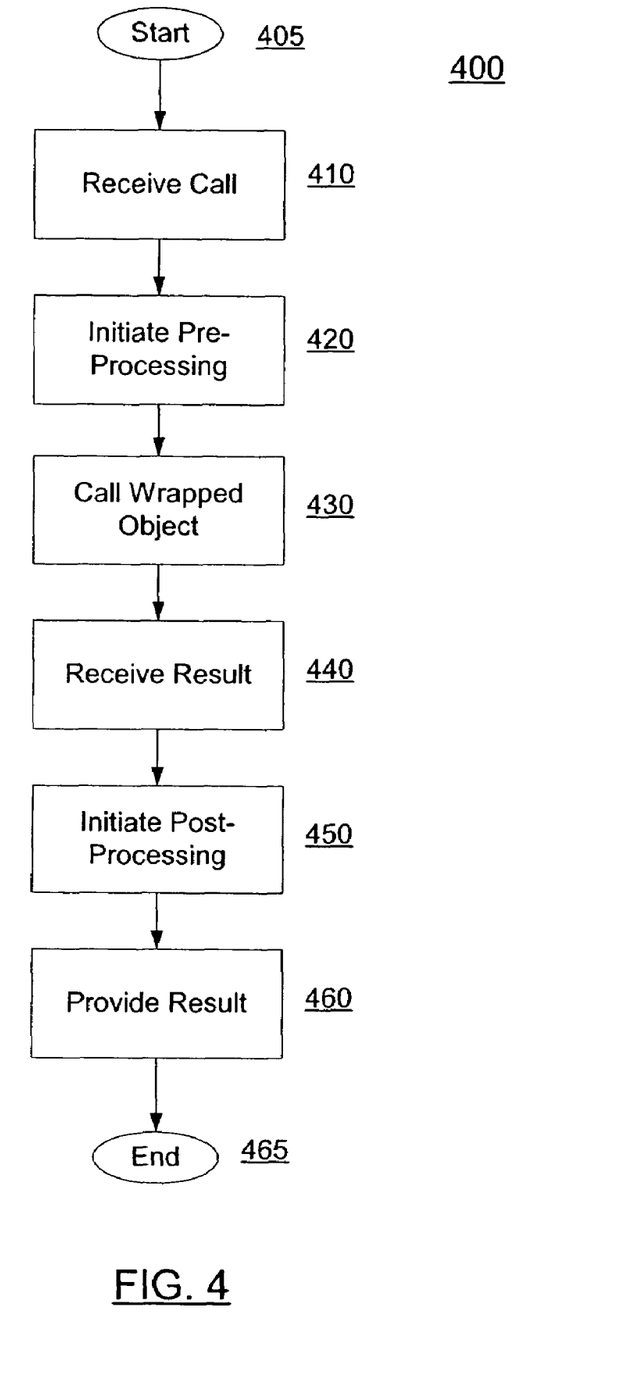
FIG. 4 is an illustration of a workflow of a dynamically generated wrapper method in accordance with one embodiment of the present invention.

Once the wrapper object is dynamically created from the vendor object and superclass, the wrapper object may be used to wrap the particular vendor object. FIG. 4 illustrates a method 400 for using a dynamic wrapper object for processing a method invocation against a vendor object in accordance with one embodiment of the present invention. Method 400 begins with start step 405. Next, a call is received by the wrapper object at step 410. The call is made by the application program to the wrapped vendor object. The wrapper object may then initiate any pre-processing to be performed at step 420. In one embodiment, the pre-processing includes calling a pre-invocation handler. The pre-invocation handler may be configured to execute server-side code before the vendor methods are invoked. Application server code to be executed before the vendor code invocation may include global transaction processing.

After any pre-processing is performed, a call is made to the wrapped vendor object at step 430. The wrapper object forwards the call to the vendor object on behalf of the application program. The result of the vendor object call is then received by the wrapper object at step 440. The wrapper object may then initiate any post-processing to be performed at step 450. In one embodiment, post-processing may include calling a post-invocation handler. The post-invocation handler may be used to perform post-processing server-side tasks including global transaction management and wrap the returned result with another wrapper. At step 460, the wrapped result is provided to the application program. Operation of method 400 then ends at step 465.

In one embodiment of the present invention, a static method may be used to generate a wrapper for a vendor object. An example of code implementing the static method in WLS is shown below.

```
package weblogic.utils.wrapper;
public class WrapperFactory {
/**
    Get a wrapper for a vendor object
*
* @param superClassName name of supper class of the wrapper class
* @param vendorObj       vendor object proxied by returned wrapper
* @param remote   whether generate a RMI remote wrapper
*
* @return           wrapper
*/
public final static Object getWrapper(
        String superClassName,
        Object vendorObj,
        boolean remote);
}
```

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, dynamically generating a vendor object wrapper.

The invention claimed is:

1. A computer-readable storage medium storing instructions for processing an invocation at a dynamically generated wrapper, comprising the steps of:
   receiving, from an application, an invocation by a wrapper object, the wrapper object instantiated from a wrapper class, the wrapper class extended from a superclass which implements a wrapper interface that includes a pre-invocation handler and a post-invocation handler, the invocation directed to a wrapped resource adapter;
   initiating pre-processing by calling a pre-invocation handler configured to execute server-side code wherein the server-side code includes transaction processing code;
   calling the wrapped object;
   receiving a result from the wrapped object;
   initiating post-processing by calling a post-invocation handler configured to execute post processing server-side tasks wherein the post-processing server-side tasks include transaction management; and
   providing the result to the application, thereby enabling the application to access vendor specific extension methods of the wrapped resource adapter;
   wherein the superclass has a member variable to hold a vendor object, a non-argument constructor to instantiate the wrapper object, and an init method to initialize the wrapper object.

2. The computer-readable medium of claim 1, wherein the wrapper object is a proxy generated at runtime and acts as a delegate for an underlying vendor object.

3. The computer-readable medium of claim 1, wherein the wrapper object is used to intercept method invocations from an application program to a vendor object and provide for execution of server side tasks in a pre-invocation handler and a post-invocation handler.

4. The computer-readable medium of claim 1, wherein the wrapper object is used to intercept a method invocation against the vendor object.

5. The computer-readable medium of claim 1, wherein the wrapper object provides for server side tasks to be performed before sending a wrapped result to the application.

6. The computer-readable medium of claim 1, wherein the wrapper object is dynamically generated at runtime by a wrapper factory on an application server.

7. The computer-readable medium of claim 1, wherein retrieved meta information from performing reflection allows an application server to dynamically generate a wrapper class that matches the vendor class.

8. The computer-readable medium of claim 1, wherein a wrapper class includes all public interfaces implemented by a vendor class and required by the application.

9. The computer-readable medium of claim 1, wherein the application can cast the wrapper object to a vendor interface to access vendor extension methods.

10. The computer-readable medium of claim 1, wherein the application server has code for dynamically generating the wrapper.

11. The computer-readable medium of claim 1, wherein a wrapper factory uses a static method to dynamically generate a wrapper.

12. A computer-readable storage medium including instructions stored therein which when read and executed by a computer cause the computer to perform steps for processing an invocation at a dynamically generated wrapper, comprising:
   receiving, from an application, a method invocation to a resource adapter;
   calling a wrapper object for processing the method invocation wherein the wrapper object is dynamically generated from a resource adapter class;
   initiating pre-processing by the wrapper object, wherein the wrapper object calls a pre-invocation handler configured to perform server side logic, wherein the server-side logic includes transaction processing logic;
   forwarding the method invocation to the resource adapter by the wrapper object on behalf of the application;
   receiving a result of the method invocation from the resource adapter by the wrapper object;
   initiating post-processing by the wrapper object, wherein the wrapper object calls a post-invocation handler configured to perform server-side logic, wherein the server-side logic includes transaction management; and providing the result to the application, thereby enabling the application to access vendor specific extension methods of the resource adapter;

wherein the wrapper object is dynamically generated at runtime by a wrapper factory on an application server;

wherein the superclass has a member variable to hold a vendor object, a non-argument constructor to instantiate the wrapper object, and an init method to initialize the wrapper object.

13. A computer-readable storage medium storing instructions for dynamically generating a wrapper object, comprising the steps of:

receiving a resource adapter class at an application server;

performing reflection on the resource adapter class to identify interfaces implemented by the resource adapter class;

dynamically generating a wrapper class at runtime that extends from a superclass, wherein the superclass implements a wrapper interface that includes a pre-invocation handler and a post-invocation handler, and the wrapper class implements the interfaces identified through reflection;

instantiating a wrapper object from the wrapper class;

initiating pre-processing by the wrapper object, wherein the pre-processing code includes calling a pre-invocation handler, wherein the pre-invocation handler is configured to execute server-side code, wherein the server-side code includes transaction processing code; and providing the wrapper object to an application that requires support for the interfaces implemented by the resource adapter class;

wherein the superclass has a member variable to hold a vendor object, a non-argument constructor to instantiate the wrapper object, and an init method to initialize the wrapper object.

14. The computer-readable medium of claim 13 further comprising:

initiating post-processing by the wrapper object, wherein post-processing including calling a post-invocation handler, wherein the post-invocation handler is configured to perform post-processing server side tasks, wherein the post-processing server-side tasks include transaction management.

15. The computer-readable medium of claim 13, wherein the wrapper object is a proxy generated at runtime and acts as a delegate for an underlying vendor object.

16. The computer-readable medium of claim 13, wherein the wrapper object is used to intercept method invocations from an application to a vendor object and provide for execution of server side tasks in a pre-invocation handler and a post-invocation handler.

17. The computer-readable medium of claim 13, wherein the wrapper object is used to intercept a method invocation against a vendor object.

18. The computer-readable medium of claim 13, wherein the wrapper object provides for server side tasks to be performed before sending a wrapped result to the application.

19. The computer-readable medium of claim 13, wherein the wrapper object is dynamically generated at runtime by a wrapper factory on the application server.

20. The computer-readable medium of claim 13, wherein retrieved meta information from performing reflection allows the application server to dynamically generate a wrapper class that perfectly matches a vendor class.

21. The computer-readable medium of claim 13, wherein the wrapper class includes all public interfaces implemented by a vendor class and required by the application.

22. The computer-readable medium of claim 13, wherein the application can cast the wrapper object to the vendor interface to access vendor extension methods.

23. The computer-readable medium of claim 13, wherein the application server has code for dynamically generating the wrapper.

24. The computer-readable medium of claim 13, wherein a wrapper factory uses a static method to dynamically generate a wrapper.

* * * * *